United States Patent
Hong

(10) Patent No.: US 7,336,325 B2
(45) Date of Patent: Feb. 26, 2008

(54) LIQUID CRYSTAL DISPLAY AND METHOD AND APPARATUS FOR DRIVING THE SAME COMPRISING OF COLOR FILTERS AND COLORED BACKLIGHTS

(75) Inventor: Hyung Ki Hong, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 98 days.

(21) Appl. No.: 10/747,397

(22) Filed: Dec. 30, 2003

(65) Prior Publication Data

US 2004/0239839 A1 Dec. 2, 2004

(30) Foreign Application Priority Data

Jun. 2, 2003 (KR) .................. 10-2003-0035340

(51) Int. Cl.
*G02F 1/1335* (2006.01)
*F21V 7/04* (2006.01)
*G09G 3/36* (2006.01)

(52) U.S. Cl. .................. 349/61; 349/106; 349/109; 362/613; 345/88

(58) Field of Classification Search .............. 349/106, 349/108, 109; 345/102; 348/742, 743; 362/613
See application file for complete search history.

(56) References Cited

U.S. PATENT DOCUMENTS

| | | | | |
|---|---|---|---|---|
| 4,828,365 A | * | 5/1989 | Stewart et al. | 349/109 |
| 5,406,299 A | * | 4/1995 | Post | 345/1.1 |
| 5,642,125 A | * | 6/1997 | Silverstein et al. | 345/87 |
| 5,781,252 A | * | 7/1998 | Gale | 349/8 |
| 5,841,492 A | * | 11/1998 | Iwauchi et al. | 349/74 |
| 6,147,728 A | * | 11/2000 | Okumura et al. | 349/106 |
| 6,315,440 B1 | * | 11/2001 | Satoh | 362/561 |
| 6,379,011 B1 | * | 4/2002 | Knox | 353/31 |
| 6,570,584 B1 | * | 5/2003 | Cok et al. | 345/690 |
| 6,672,733 B2 | * | 1/2004 | Nagatani | 362/614 |
| 6,903,718 B2 | * | 6/2005 | Son | 345/102 |
| 2002/0191130 A1 | * | 12/2002 | Liang et al. | 349/108 |
| 2004/0246225 A1 | * | 12/2004 | Mukawa et al. | 345/102 |
| 2005/0018108 A1 | * | 1/2005 | Okumura et al. | 349/106 |

FOREIGN PATENT DOCUMENTS

WO    WO 2101644 A2 * 12/2002

* cited by examiner

*Primary Examiner*—Andrew Schechter
*Assistant Examiner*—W. Patty Chen
(74) *Attorney, Agent, or Firm*—McKenna Long & Aldridge LLP

(57) ABSTRACT

A method and apparatus for driving a liquid crystal display (LCD) panel having pixels arranged in a matrix pattern, wherein each pixel includes two sub-pixels capable of transmitting complementary colors, includes a light source array having first to third light sources and a data driver for applying data signals to the LCD panel during first and second sub-frames of the LCD panel, wherein the first and second sub-frames constitute a single frame of the LCD panel. Two of the first to third light sources may be activated during each sub-frame to emit light to the liquid crystal display panel, wherein a full color image is realized in only two sub-frames.

24 Claims, 13 Drawing Sheets

LIQUID CRYSTAL DISPLAY AND METHOD AND APPARATUS FOR DRIVING THE SAME COMPRISING OF COLOR FILTERS AND COLORED BACKLIGHTS

This application claims the benefit of Korean Patent Application No. P2003-35340, filed on Jun. 2, 2003, which is hereby incorporated by reference for all purposes as if fully set forth herein.

BACKGROUND OF THE INVENTION

1. Field of the Invention

The present invention relates to methods and apparatuses for driving liquid crystal display (LCD) panels. More particularly, the present invention relates to a method and an apparatus for driving an LCD panel that is capable of displaying moving pictures to increased brightness levels.

2. Description of the Related Art

Generally, liquid crystal display (LCD) devices display pictures by adjusting light transmittance characteristics of liquid crystal cell array in accordance with externally applied video signals. Active matrix type LCD devices are capable of displaying moving pictures. Accordingly, active matrix type LCD devices typically include switching devices such as thin film transistors (TFTs) arranged within each liquid crystal cell.

Depending on the response speed of liquid crystal material provided within each liquid crystal cell, a motion blurring phenomenon, wherein images are ambiguously displayed, and a tailing phenomenon, wherein contours of moving images may appear during operation of the LCD device. When the response speed of the liquid crystal is faster than a typical frame period (i.e., 16.7 ms), the appearance of moving images cannot be prevented from deteriorating.

Cathode ray tubes (CRTs) are impulse-type display devices that display images only momentarily. Accordingly, CRTs do not maintain data signals throughout an entire frame period but can display moving images while minimizing the motion blurring and tailing phenomena.

FIG. 1 illustrates impulse characteristics of related art cathode ray tubes.

Referring to FIG. 1, individual pixels of a related art CRT, each comprised of fluorescent material, radiate light for only a fraction of a frame period of the CRT (i.e., 16.7 ms) while remaining dark during the remainder of the frame period. Accordingly, individual pixels of the CRT display data for only a fraction of a frame period, thereby enabling CRTs to display moving images with an acceptable level of clarity.

FIG. 2 illustrates data voltage maintaining characteristics of related art liquid crystal display devices.

Referring to FIG. 2, and contrary to related art CRTs, individual pixels of related art LCD devices display images for the duration of the entire frame period. Accordingly, individual pixels maintain data throughout the frame period. Due to the aforementioned maintaining characteristic of related art LCD devices, the clarity to which moving images are displayed becomes deteriorated via the aforementioned motion blurring and tailing phenomena.

FIG. 3 illustrates a perspective view of a related art scanning backlight blinking system.

In order to minimize the degree to which the clarity of moving images are displayed by LCD devices is deteriorated, a related art scanning backlight blinking system has been proposed. Accordingly, the related art scanning backlight blinking system generally includes a backlight unit having first to fifth lamps 10a to 10e. Accordingly, the backlight unit radiates light to a LCD panel 1 by sequentially turning the plurality of lamps 10a to 10e on and off in accordance with data signals applied to the LCD panel 1.

Referring still to FIG. 3, when a center region of the LCD panel 1 transmits light emitted by a turned-on third lamp 10c, regions of the LCD panel 1 other than the center region do not transmit light because the first, second, fourth, and fifth lamps 10a, 10b, 10d, and 10e, are turned off. Moreover, the of the LCD panel 1 regions other than the center region remain dark while data signals while data signals are maintained within the liquid crystal cells arranged within those regions.

FIG. 4 illustrates impulse characteristics of a related art liquid crystal display device driven by a related art scanning backlight blinking system.

Referring to FIG. 4, and when the plurality of lamps 10a to 10e are sequentially are turned-on and off, the individual regions of the LCD panel 1 transmit light during a fraction of frame period of the LCD panel 1 (i.e., 16.7 ms) and remain dark during the remainder of the frame period. While the aforementioned related art scanning backlight blinking system can improve the clarity with which moving images are displayed by LCD panels 1, the scanning backlight blinking system undesirably causes regions of the LCD panel to remain for excessively long periods of time during any given frame period of the LCD panel. As a result, implementation of the scanning backlight blinking system tends to reduce the overall brightness to which images are displayed by the LCD panel 1 by as much as 50%.

FIG. 5 illustrates a liquid crystal display panel driven according to a related art field sequential driving system.

Referring to FIG. 5, the related art field sequential driving system (FS driving system) can be used to overcome problems associated with the scanning backlight blinking system. According to the FS driving system, a color filter typically formed on an upper substrate 20 of an LCD panel is removed and a backlight unit, including red, green, and blue light sources 32R, 32G, and 32B, is provided beneath a lower substrate 30 of the LCD panel.

FIG. 6 illustrates an operation of the related art FS driving system shown in FIG. 5 applied to a liquid crystal display panel.

Referring to FIG. 6, upon operation of the related art FS driving system, the red, green, and blue light sources 32R, 32G, and 32B are sequentially turned on and off in accordance with data signals charged to liquid crystal cells of the LCD panel. More specifically, during a scanning period (i.e., when gate pulses are applied to TFTs within liquid crystal cells), red data signals are charged to liquid crystal cells. Next, voltages corresponding to the charged red data signals are applied to liquid crystal material arranged within the liquid crystal cells. In response to the applied voltages, an orientation of molecules within the liquid crystal material becomes altered, thereby effecting an alteration in the light transmittance characteristics of the liquid crystal cell. Accordingly, time required to fully alter the light transmittance characteristics of the liquid crystal cell depends upon how quickly the molecular orientation of the liquid crystal material fully responds to the applied voltage (i.e., the response time of the liquid crystal material). Subsequently, the FS driving system turns the red light source 32R on to emit red light. Accordingly, the aforementioned FS steps of charging data signals, effecting a liquid crystal response, and turning on/off the red light source 32R occurs during a sub-frame period constituting ⅓ of the total frame period of the LCD panel (i.e., 5.56 ms). After the red light sourced 32R emits the red light, the aforementioned FS steps are sequentially repeated for green and blue data and colors.

Because data voltages specific to R, G, and B colors are applied to the LCD panel sub-frame periods one-third as long as a single frame period, benefits of the aforementioned related art FS driving method cannot be fully realized in certain types of LCD panels. More specifically, response times of TN mode LCD panels are generally longer than one frame period. Since the related art FS driving method requires that frame periods be sub-divided into sub-frame periods 5.56 ms in duration, liquid crystal molecules cannot fully respond to applied voltages, thereby preventing light transmittance characteristics of liquid crystal cells within the TN mode LCD panel from being fully altered. Accordingly, light emitted by light sources is transmitted by liquid crystal cells of TN mode LCD panels at a less than maximal intensity. Accordingly, when driven according to the aforementioned related art FS driving system, TN mode LCD panels undesirably display images at reduced brightness levels.

In view of the discussion above, benefits of the related art FS driving system can only be fully realized when applied to LCD panels having relatively fast response times (e.g., OCB or FLC mode LCD panels). Moreover, the related art FS driving system is difficult to integrate with LCD panels having high resolutions (e.g., VGA or greater) because high resolution LCD panels typically include liquid crystal cells that are formed using amorphous-type TFTs. Amorphous-type TFTs have a relatively low charge mobility, wherein the charge mobility of TFTs within liquid crystal cells affects the speed with which voltages may be applied to liquid crystal material.

SUMMARY OF THE INVENTION

Accordingly, the present invention is directed to a liquid crystal display and method and apparatus for driving the same that substantially obviates one or more of the problems due to limitations and disadvantages of the related art.

An advantage of the present invention provides a method and an apparatus for driving a liquid crystal display panel capable of displaying moving pictures to an increased brightness.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display panel may, for example, include pixels, wherein each pixel includes two sub-pixels wherein color displayable by each of the two sub-pixels are complementary.

In one aspect of the present invention, the two sub-pixels may, for example, include a blue sub-color filter capable of transmitting blue light and absorbing light other than blue light; and a yellow sub-color filter capable of transmitting red and green light and absorbing the light other than red and green light.

In another aspect of the present invention, the area of the blue sub-pixel may be smaller than the area of the yellow sub-pixel.

According to principles of the present invention, an apparatus for driving a liquid crystal display panel having pixels arranged in a matrix pattern, wherein each pixel includes two sub-pixels, may, for example, include a light source array having first to third light sources capable of emitting light having first to third colors, respectively, to the liquid crystal display panel; and a light source driver capable of driving the light source array during two sub-frames of one frame period of the liquid crystal display panel, wherein at least two of the first to the third light sources emit light during each sub-frame.

In one aspect of the present invention, the two sub-pixels may, for example, include a blue sub-pixel capable of transmitting blue light and absorbing light other than blue light; and a yellow sub-pixel capable of transmitting red and green light and absorbing the light other than red and green light.

In another aspect of the present invention, the first light source may emit red light, the second light source may emit green light, and the third light source may emit blue light.

In still another aspect of the present invention, the light source driver may activate the first and the third light sources one of the two sub-frames and activate the second and the third light sources during the other of the two sub-frames.

In yet another aspect of the present invention, the light source driver may divide gate lines arranged on the liquid crystal display panel into a plurality of gate line groups and drive the first to the third light sources in accordance with an activation state of the gate lines in each gate line group.

In still a further aspect of the present invention, the apparatus may further include a data driver for applying red, green, and blue data signals to the liquid crystal display panel during one frame period; a gate driver for scanning gate lines of the liquid crystal display panel at least twice during one frame period; and a timing controller for controlling the data driver, the gate driver, and the light source driver.

In yet a further aspect of the present invention, the area of the blue sub-pixel may be smaller than the area of the yellow sub-pixel.

In still a further aspect of the present invention, the third light source, capable of emitting blue light, may be smaller than the first and second light sources, respectively capable of emitting the red and green light.

According to principles of the present invention, a method of driving a liquid crystal display panel may, for example, include dividing one frame period of a liquid crystal display panel into a first sub-frame and a second sub-frame; and emitting at least two predetermined colors of light to the liquid crystal display panel, wherein the liquid crystal display panel includes pixels arranged in a matrix pattern, wherein each pixel includes two sub-pixels, and wherein color displayable by each of the two sub-pixels is complementary.

In one aspect of the present invention, the two sub-pixels may, for example, include a blue sub-pixel capable of transmitting blue light and absorbing light other than blue light; and a yellow sub-pixel capable of transmitting red and green light and absorbing the light other than red and green light.

In another aspect of the present invention, upon emitting the at least two predetermined colors of light, at least two light sources of first to third ones of light sources may be activated.

In still another aspect of the present invention, activating at least two of first to third light sources may, for example, include turning on the first and second light sources during the first sub-frame to emit red and blue light; and turning on the second and third light sources during the second subframe to emit blue and green light.

In still another aspect of the present invention, upon emitting the at least two predetermined colors of light, the first and third light sources may be driven in accordance with an activation state of gate lines of the liquid crystal display panel, wherein the gate lines are divided into gate line groups.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 7:
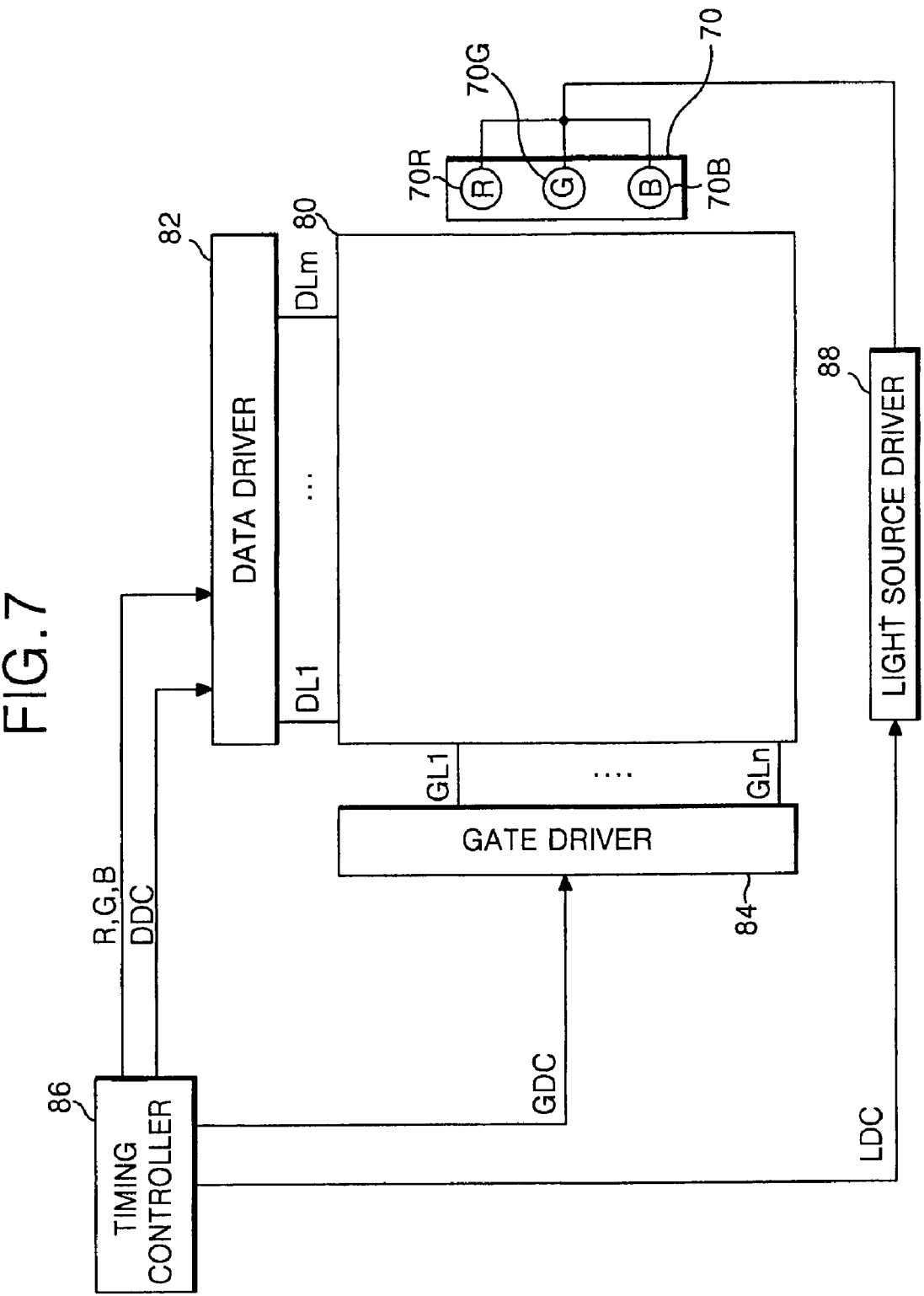
FIG. 7 schematically illustrates a liquid crystal display panel and apparatus for driving the liquid crystal display panel according to principles of the present invention.

FIG. 7 schematically illustrates a liquid crystal display panel and apparatus for driving the liquid crystal display panel according to principles of the present invention.

Referring to FIG. 7, a driving apparatus according to principles of the present invention, and capable of driving a liquid crystal display (LCD) panel 80, may, for example, include a data driver 82 for driving data lines DL of the LCD panel 80, a gate driver 84 for driving gate lines GL of the LCD panel 80; a light source driver 88 for driving a light source array 70; and a timing controller 86 for controlling the operation of the light source driver 88, the gate driver 84, and the data driver 82.

Figure 9:
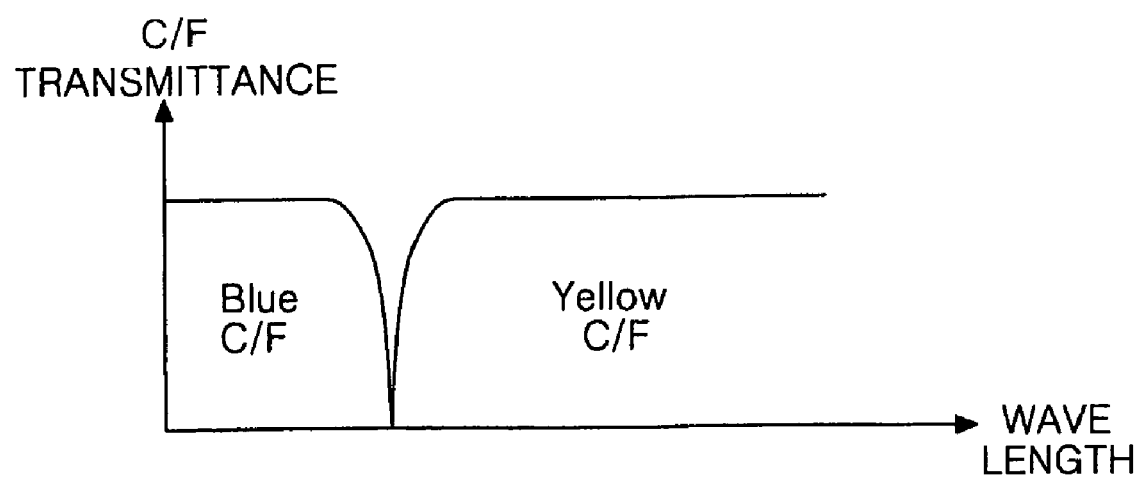
FIG. 9 illustrates light intensity and light transmittance characteristics of the lamp array and color filter, respectively, shown in FIG. 7.
Figure 9:
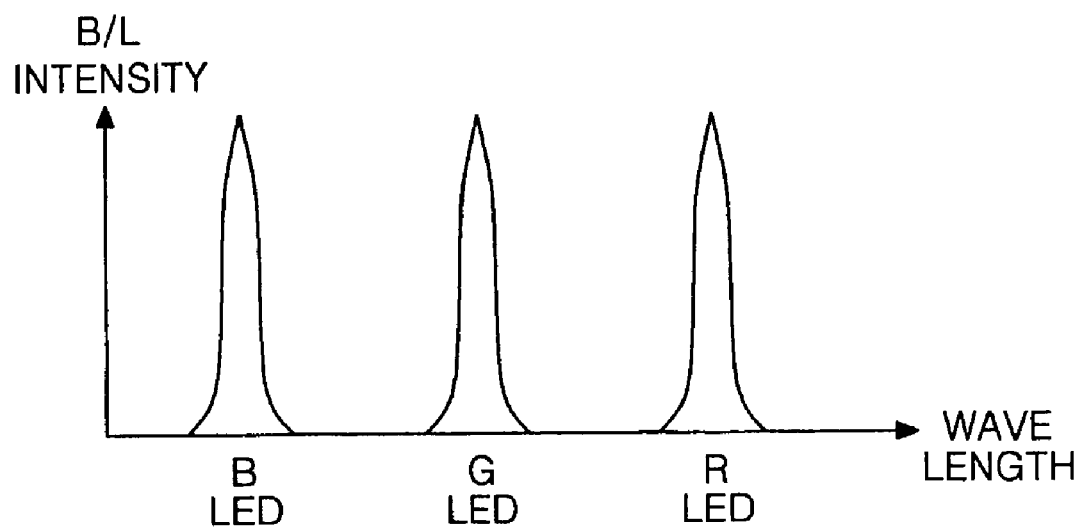

According to principles of the present invention, the light source array 70 may, for example, include red, green, and blue light sources 70R, 70G, and 70B, respectively. An exemplary illustration of the emission characteristics of the various light sources described above is shown with reference to FIG. 9. In one aspect of the present invention, any of the light sources within the light source array 70 may be provided as a cold-cathode fluorescent lamps, a light emitting diode, or any other suitable light source.

Figure 8:
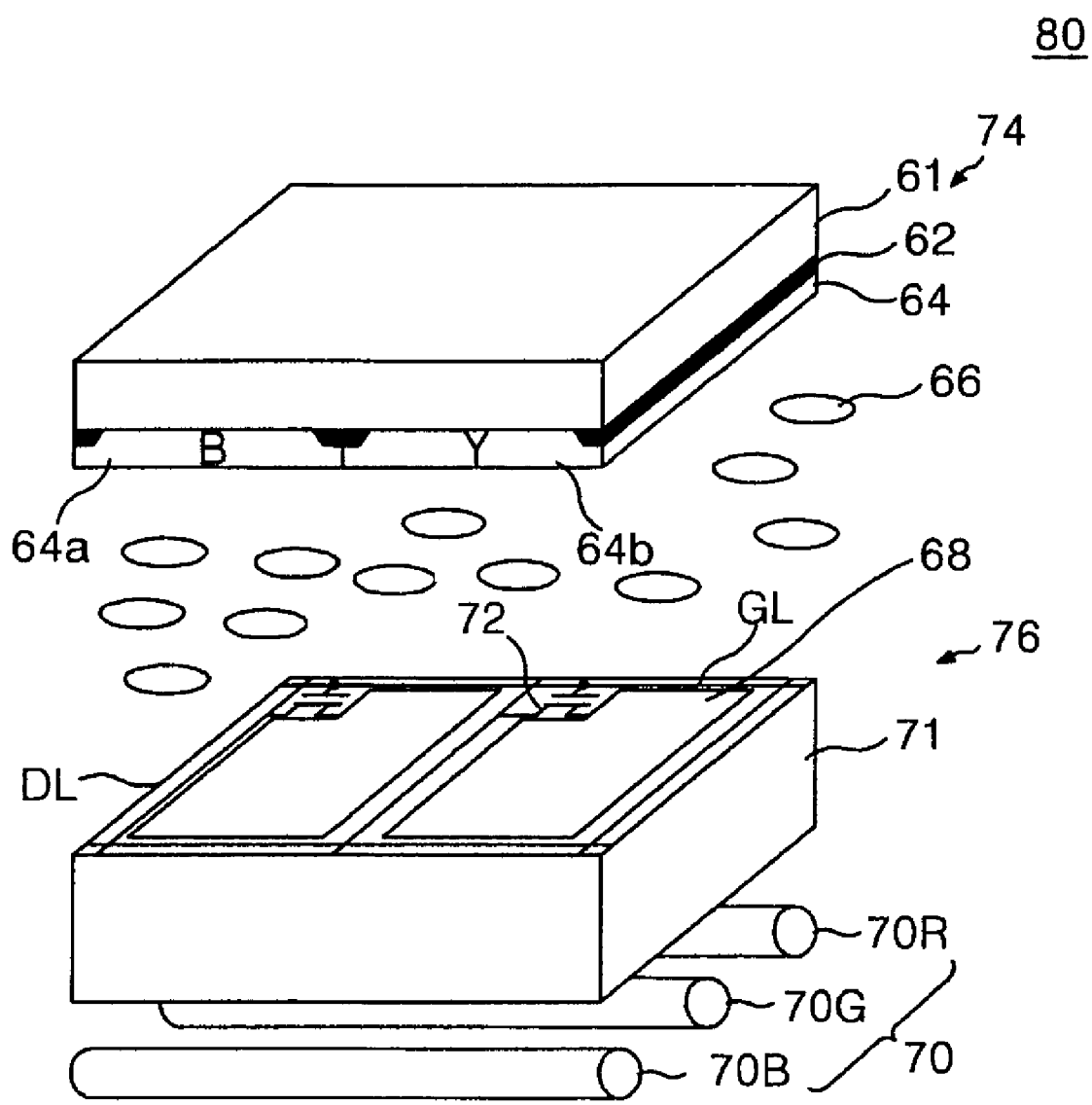
FIG. 8 illustrates a perspective view of the liquid crystal display panel shown in FIG. 7.

FIG. 8 illustrates a perspective view of the liquid crystal display panel shown in FIG. 7.

Referring to FIG. 8, the LCD panel 80 according to principles of the present invention may, for example, include an upper array substrate 74; a lower array substrate 76 facing, and spaced apart from, the upper array substrate 74; and liquid crystal 66 arranged between the upper and lower array substrates 74 and 76, respectively.

In one aspect of the present invention, the lower array substrate 76 may, for example, include a lower substrate 71; the plurality of gate lines GL arranged on, and insulated from the lower substrate 71; the plurality of data lines DL crossing with, and insulated from, the plurality of gate lines GL; a plurality of thin film transistors (TFTs) 72 arranged at crossings of the gate and data lines GL and DL, respectively; and a plurality of pixel electrodes 68 connected to the TFTs 72 in pixel regions defined by the crossings of the gate and data lines GL and DL, respectively. Accordingly, the LCD panel 80 a plurality of liquid crystal cells (i.e., pixels) may be defined by crossings of a plurality of gate lines GL and a plurality of data lines DL.

In one aspect of the present invention, the upper array substrate 74 may, for example, include an upper substrate 61, a black matrix 62 arranged on the upper substrate 61, and a color filter 64 array having sub-color filters arranged in pixel regions defined by the black matrix 62.

According to principles of the present invention, the black matrix 62 may be arranged between sub-color filters and prevent light from being transmitted by the LCD panel 80 in regions between adjacent pixels, thereby improving the contrast of the LCD panel 80.

According to principles of the present invention, the color filter 64 may, for example, include a plurality of first sub-color filters 64A and a plurality of second sub-color filters 64B. In one aspect of the present invention, the color of light that is transmittable by the first sub-color filter 64A may be complementary to the color of light that is transmittable by the second sub-color filter 64B. For example, the first sub-color filter 64A may transmit blue (B) light while the second sub-color filter 64B may transmit yellow (Y) light. Alternatively, the first sub-color filter 64A may transmit green (G) light while the second sub-color filter 64B may transmit magenta (M) light. Alternatively still, the first sub-color filter 64A may transmit red (R) light while the second sub-color filter 64B may transmit cyan (C) light. For explanatory purposes only, however, the principles of the present invention will now be described where first sub-color filter 64A transmits blue (B) light and the second sub-color filter 64B transmits yellow (Y) light.

Because the first sub-color filter 64A transmits blue (B) light, it also absorbs red (R) and green (G) light. Similarly, because the second sub-color filter 64B transmits yellow (Y) light, it transmits red (R) and green (G) light while absorbing blue (B) light. Accordingly, red (R) light incident to the second sub-color filter 64B is transmitted as red (R) light by the second sub-color filter 64B. Similarly, green (G) light incident to the second sub-color filter 64B is transmitted as green (G) light by the second sub-color filter 64B. An exemplary illustration of the transmission/absorption characteristics of the sub-color filters described above is shown with reference to FIG. 9.

As mentioned above, the LCD panel 80 includes a plurality of liquid crystal cells (i.e., pixels) arranged in a matrix pattern. For purposes of discussion, however, a group of adjacent pixels capable of transmitting all colors of light emittable by the light source array 70 will hereinafter be referred to as a pixel. Therefore, and according to principles of the present invention, each pixel may include a first sub-pixel and a second sub-pixel.

In one aspect of the present invention, the first sub-pixel may, for example, include the first sub-color filter 64A and a corresponding pixel electrode 68 arranged within the same pixel region as the first sub-color filter 64A. In another aspect of the present invention, the second sub-pixel may, for example, include the second sub-color filter 64B and a corresponding pixel electrode 68 arranged within the same pixel region as the second sub-color filter 64B.

In one aspect of the present invention, light transmittance characteristics of the liquid crystal 66 may be adjusted in the presence of a voltage difference between an adjacent pixel electrode 68 and a common electrode (not shown) supported by the upper substrate 61. Accordingly, when the light transmittance characteristics of the liquid crystal 66 are adjusted, the liquid crystal 66 can be said to have "responded" to a voltage applied to the liquid crystal cell it is located within.

Referring back to FIG. 7, the timing control unit 86 may apply externally provided digital red, green, and blue pixel data signals (R,G,B) to data driver 82. Moreover, the timing control unit 86 may generate a gate control signal (GDC), a data control signal (DDC), and a light source control signal (LDC) for controlling the gate driver 84, the data driver 82, and the light source driver 88, respectively, in response to various externally applied control signals H, V, DE, and CLK. In one aspect of the present invention, the gate control signals GDC may, for example, include a gate start pulse GSP, a gate shift clock signal GSC, a gate output enable signal GOE, and the like. In another aspect of the present invention, the data control signal may, for example, include a source start pulse SSP, a source shift clock signal SSC, a source output enable signal SOE, and a polarity control signal POL, and the like.

According to principles of the present invention, the gate start pulse GSP may be applied to each of the gate lines GL at least twice during one frame period of the LCD panel 80. Moreover, the light source control signal LDC may, for example, be provided as a high logic signal and a low logic signal for activating and deactivating, respectively, the red, green, and blue light sources within the light source array 70.

The gate driver 84 may sequentially apply gate high voltages VGH to each of the gate lines GL1 to GLn in response to the gate control signals GDC outputted from the timing controller 86. Accordingly, the gate driver 84 may sequentially drive TFTs connected to the gate lines GL1 to GLn.

The data driver 82 may simultaneously apply pixel signals to each of the data lines DL1 to DLm in accordance a horizontal period (H1, H2, . . . ), during which the gate high voltages VGH are sequentially applied to the gate lines GL, in response to the data control signals DDC outputted from the timing controller 86. In one aspect of the present invention, the data driver 82 may convert the externally applied digital pixel data, outputted from the timing controller 86, into analog pixel signals using gamma voltages outputted from a gamma voltage generator (not shown).

According to principles of the present invention, the data driver 82 may divide a single frame period of the LCD panel 80 (e.g., about 16.7 ms) into first and second sub-frames each having a period of about 8.35 ms. Moreover, the data driver 82 may apply two of red, green, and blue pixel signals to the data lines DL during each first and second sub-frames to display a full color image. For example, the data driver 82 may apply red pixel signals and blue pixel signals to the data lines DL during a first sub-frame. Subsequently, the data driver 82 may apply blue and green pixel signals to the data lines DL during a second sub-frame, wherein the first and second sub-frames constitute a single frame period of the LCD panel 80.

The light source driver 88 may activate and deactivate red, green, and blue light sources 70R, 70G, and 70B, respectively, included within the light source array 70, based on signals outputted by the timing controller 86 during the first and second sub-frames. In one aspect of the present invention, the light source driver 88 may respond to the light control signal LDC, provided as a high logic signal, to activate the red and blue light sources 70R and 70B and to deactivate the green light source 70G during the first sub-frame. Further, the light source driver 88 may respond to the light source control signal LDC, provided as a low logic signal, to activate the green and blue light sources 70G and 70B and to deactivate the red light source 70R during the second sub-frame.

Having described the LCD panel 80 and the apparatus for driving the same according to principles of the present invention, an operation of the light source driver 88 will now be explained in greater detail.

Figure 10A:
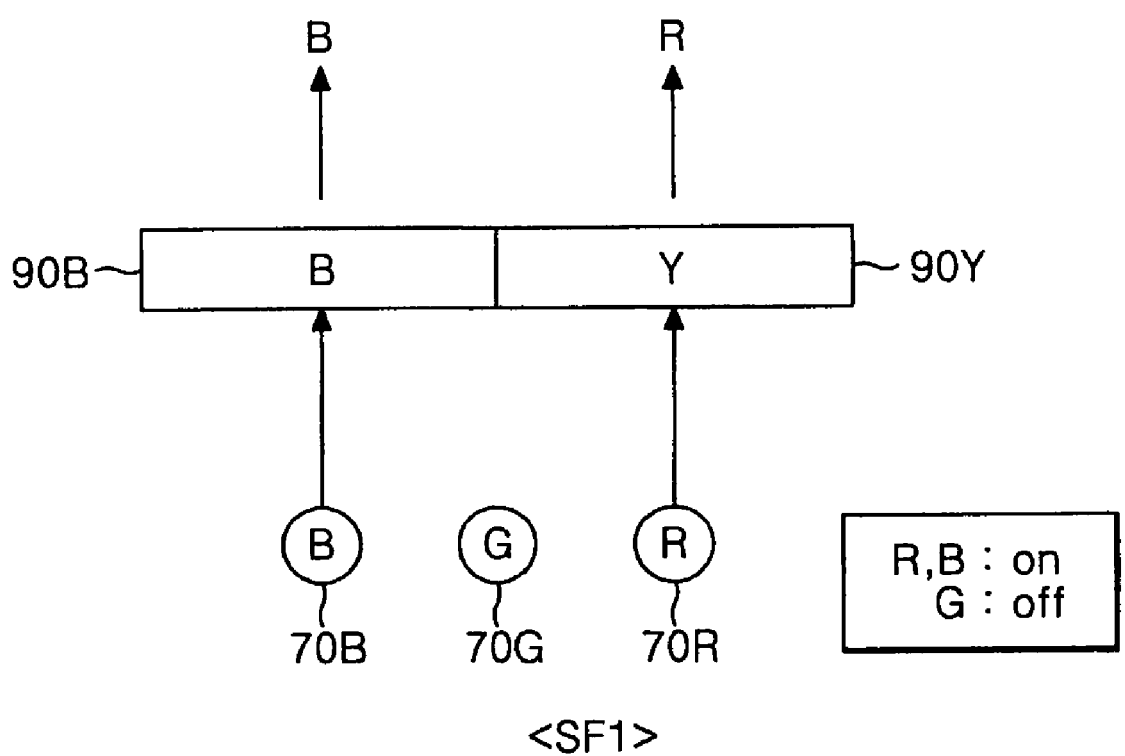
FIGS. 10A and 10B illustrate light transmittance characteristics of yellow and blue sub-pixels during first and second sub-frames.
Figure 10B:
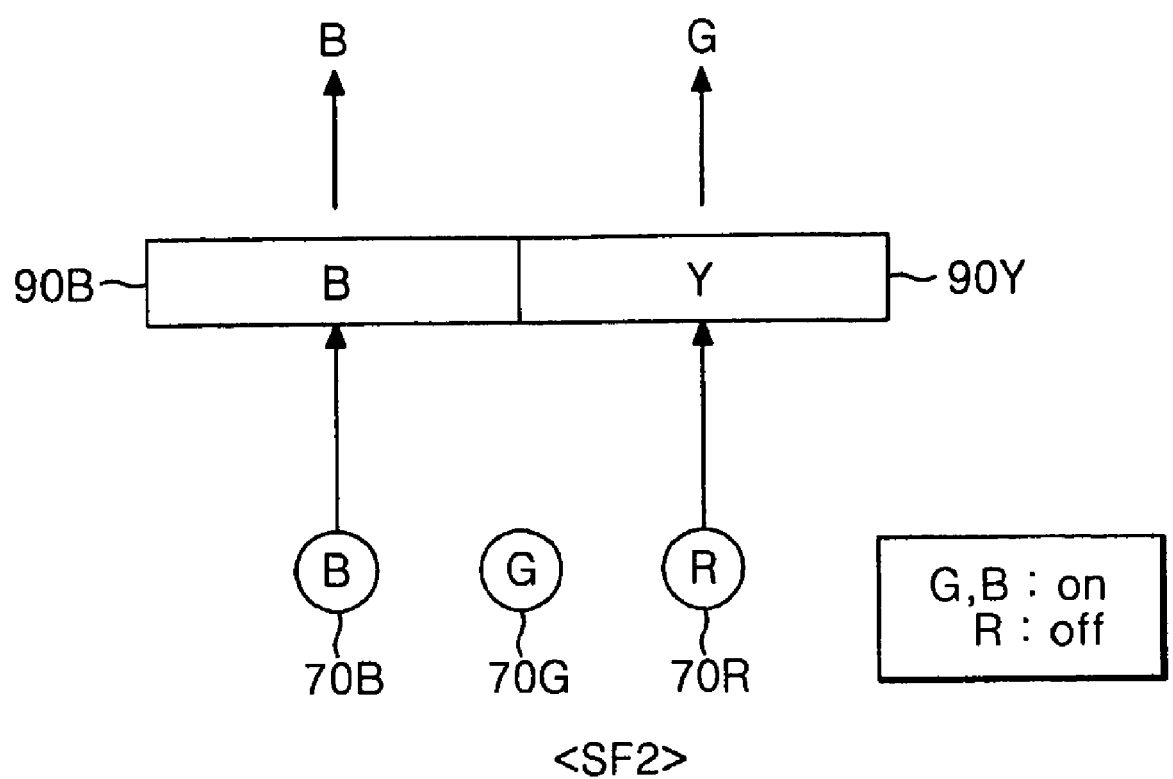
Figure 11A:
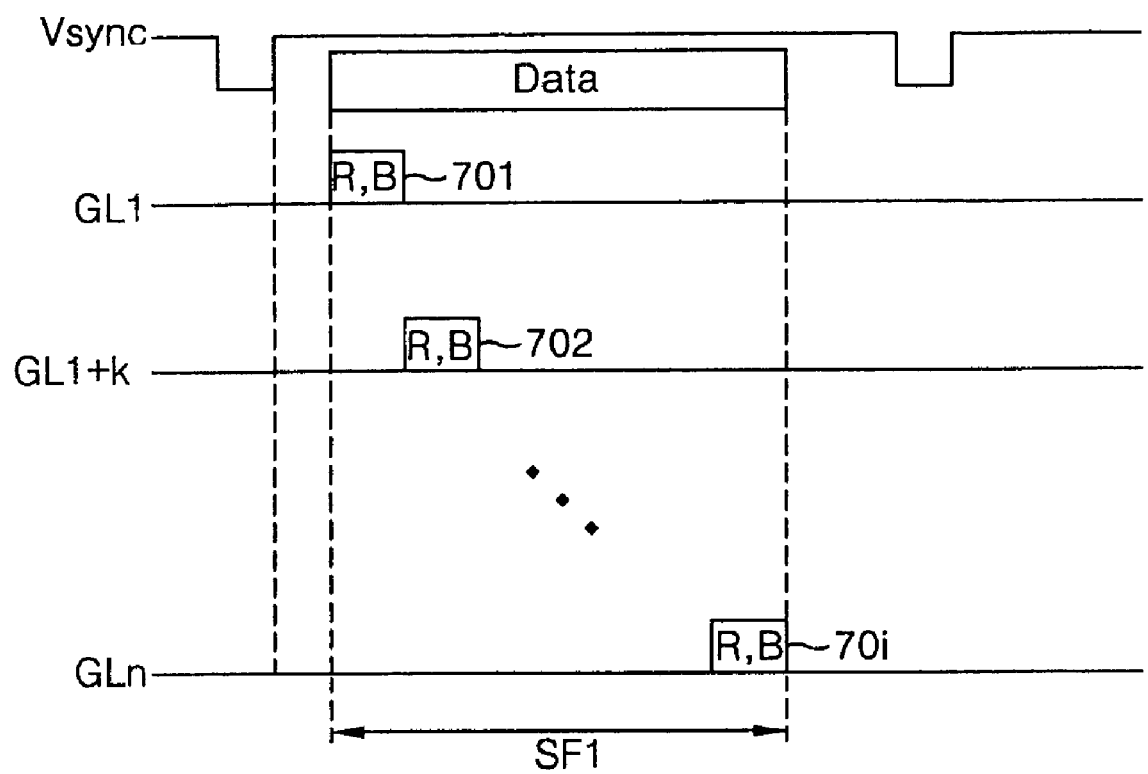
FIGS. 11A and 11B illustrate activation sequences of first to third light sources during first and second sub-frames.
Figure 11B:
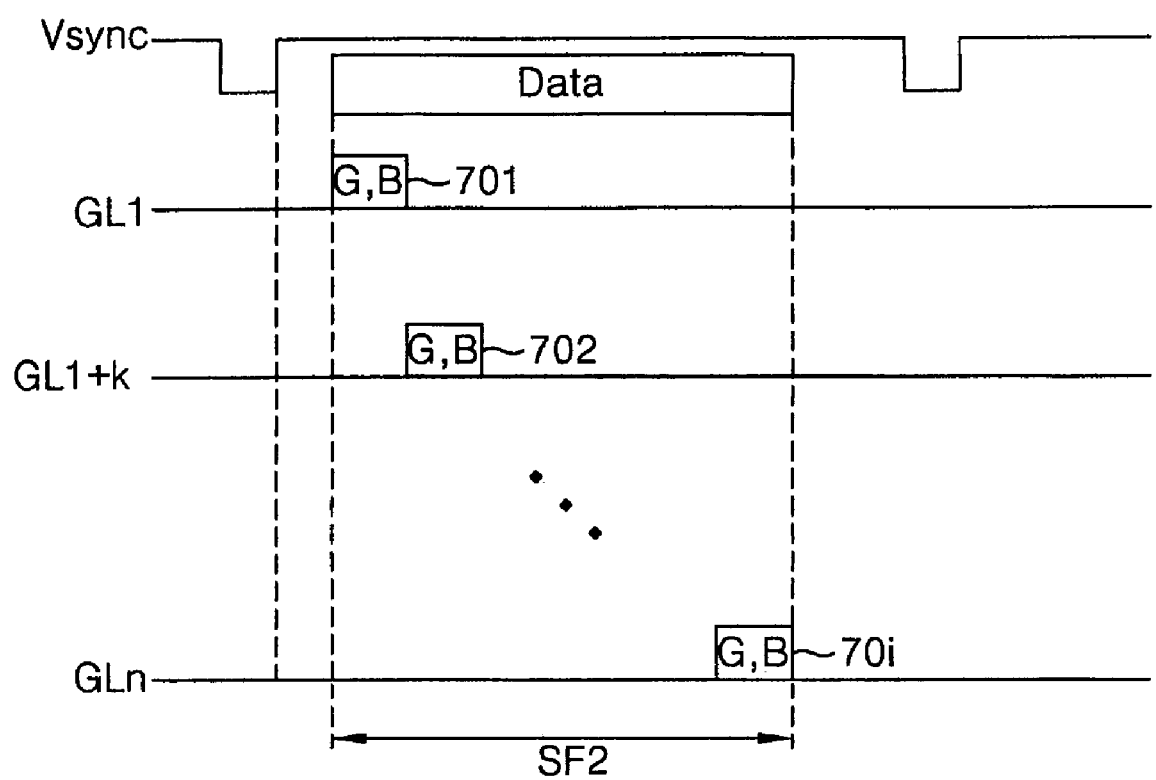

FIGS. 10A and 10B illustrate light transmittance characteristics of yellow and blue sub-pixels during first and second sub-frames. FIGS. 11A and 11B illustrate activation sequences of first to third light sources during first and second sub-frames.

Referring to FIG. 10A, during the first sub-frame SF1, the red and blue light source 70R and 70B, respectively, are activated in accordance with the scanning of the plurality of gate lines GL. As a result, red light is emitted by the activated red light source 70R and blue light is emitted by the activated blue light source 70B. Accordingly, the red light incident to the second sub-color filter 64B (a yellow (Y) color filter) is transmitted by the second sub-color filter 64B as red (R) light while the red light incident to the first sub-color filter 64A (a blue (B) color filter) is absorbed. Further, blue light incident to the first sub-color filter 64A (a blue (B) color filter) is transmitted by the first sub-color filter 64A while the blue light incident to the second sub-color filter (a yellow (Y) color filter) is absorbed.

Referring to FIG. 10B, during the second sub-frame SF2, the green and blue light sources 70G and 70B, respectively, are activated in accordance with the scanning of the plurality of gate lines GL. As a result, green light is emitted by the activated green light source 70G and blue light is emitted by the activated blue light source 70B. Accordingly, the green light incident to the second sub-color filter 64B (a yellow (Y) color filter) is transmitted by the second sub-color filter 64B as green (G) light while blue light while the green light incident to the first sub-color filter 64A (a blue (B) color filter) is absorbed. Further, blue light incident to the first sub-color filter 64A (a blue (B) color filter) is transmitted by the first sub-color filter 64A while the blue light incident to the second sub-color filter (a yellow (Y) color filter) is absorbed.

During the first and second sub-frames SF1 and SF2, predetermined ones of the red, green, and blue light sources 70R, 70G, and 70B of the light source array 70 may be activated and deactivated upon applying gate pulses to gate lines arranged within at least one gate line group. For example, the first to $n^{th}$ gate lines GL1 to GLn may be included within a single gate line group. In one aspect of the present invention, however, sequentially arranged ones of the first to $n^{th}$ gate lines GL1 to GLn of the LCD panel 80 may be grouped within at least two (e.g., first and second gate line groups) gate line groups. In another aspect of the present invention, each gate line GL may be considered as part of a unique gate line group.

Referring to FIG. 11A, where, for example, each gate line GL is considered as part of a unique gate line group, the red and blue light sources 70R and 70B, respectively, may be activated and deactivated during the first sub-frame SF1 upon sequentially applying gate pulses to each of the gate lines, as shown in FIG. 11A. For example, upon applying a gate pulse to a specific gate line (i.e., upon selecting a gate line), red and blue data signals may be applied to the selected liquid crystal cells connected to the selected gate line, corresponding data voltages may be charged to liquid crystal material within the selected liquid crystal cells, a response may be effected by the liquid crystal material, and, upon effecting a response by the liquid crystal material, the red and blue light sources 70R and 70B may be turned on and off. Accordingly, the red and blue light sources 70R and 70B may be may be activated and deactivated according to the application of the gate pulses applied to the gate lines.

However, where first to $(1+k)^{th}$ gate lines GL1 to GL(1+k) (where k is less than n) are included within, for example, a first gate line group and $(2+k)^{th}$ to $n^{th}$ gate lines GL(2+k) to GLn are included within, for example, a second gate line group, the red and blue light sources 70R and 70B may be activated and deactivated upon sequentially applying gate pulses to the gate lines within each of the gate line groups. For example, upon applying gate pulses to gate lines within the first gate line group (i.e., upon selecting the gate lines within the first gate line group), red and blue data signals may be applied to the selected liquid crystal cells connected to the first to $(1+k)^{th}$ gate lines GL1 to GL(1+k), corresponding data voltages may be charged to liquid crystal material within the selected liquid crystal cells, a response may be effected by the liquid crystal material, and, after effecting a response by the liquid crystal material, the red and blue light sources 70R and 70B may be turned on and off. Upon sequentially applying gate pulses to each of the gate lines within the second gate line group, red and blue data signals may be applied to the selected liquid crystal cells connected to the $(2+k)^{th}$ to $n^{th}$ gate lines GL(2+k) to GLn, corresponding voltages may be charged to liquid crystal material within the selected liquid crystal cells, a response may be effected by the liquid crystal material, and, upon effecting a response within the liquid crystal material, the red and blue light sources 70R and 70B may be turned on and off. Accordingly, the red and blue light sources 70R and 70B may be may be activated according to the application of the gate pulses applied to the gate lines within each gate line group.

Referring to FIG. 11B, where, for example, each gate line GL is considered as part of a unique gate line group, the green and blue light sources 70G and 70B, respectively, may be activated and-deactivated during the second sub-frame SF2 upon sequentially applying gate pulses to each of the gate lines, as shown in FIG. 11B. For example, upon applying a gate pulse to a specific gate line (i.e., upon selecting a gate line), green and blue data signals may be applied to the selected liquid crystal cells connected to the selected gate line, corresponding data voltages may be charged to liquid crystal material within the selected liquid crystal cells, a response may be effected by the liquid crystal material, and, upon effecting a response by the liquid crystal material, the green and blue light sources 70G and 70B may be turned on and off. Accordingly, the green and blue light sources 70R and 70B may be may be activated and deactivated according to the application of the gate pulses applied to the gate lines.

However, where first to $(1+k)^{th}$ gate lines GL1 to GL(1+k) (where k is less than n) are included within, for example, a first gate line group and $(2+k)^{th}$ to $n^{th}$ gate lines GL(2+k) to GLn are included within, for example, a second gate line group, the green and blue light sources 70G and 70B may be activated and deactivated upon sequentially applying gate pulses to the gate lines within each of the gate line groups. For example, upon applying gate pulses to gate lines within the first gate line group (i.e., upon selecting the gate lines within the first gate line group), green and blue data signals may be applied to the selected liquid crystal cells connected to the first to $(1+k)^{th}$ gate lines GL1 to GL(1+k), corresponding data voltages may be charged to liquid crystal material within the selected liquid crystal cells, a response may be effected by the liquid crystal material, and, after effecting a response by the liquid crystal material, the green and blue light sources 70G and 70B may be turned on and off. Upon sequentially applying gate pulses to each of the gate lines within the second gate line group, green and blue data signals may be applied to the selected liquid crystal cells connected to the $(2+k)^{th}$ to $n^{th}$ gate lines GL(2+k) to GLn, corresponding voltages may be charged to liquid crystal material within the selected liquid crystal cells, a response may be effected by the liquid crystal material, and, upon effecting a response within the liquid crystal material, the green and blue light sources 70G and 70B may be turned on and off. Accordingly, the green and blue light sources 70G and 70B may be may be activated according to the application of the gate pulses applied to the gate lines within each gate line group.

As evidenced above, the blue light source 70B is activated during the first and second sub-frames while the red and green light sources 70R and 70G, respectively, are selectively activated only during respective first and second sub-frames. To prevent deterioration in the white balance displayable by the LCD panel, however, the blue light source 70B included within the light source array 70 may be smaller than the red and green light sources 70R and 70G. For example, the blue light source 70B may emit light at a lesser intensity than red and green light sources 70R and 70G. Further, the area of the first sub-pixel may be less than the area of the second sub-pixel.

Figure 1:
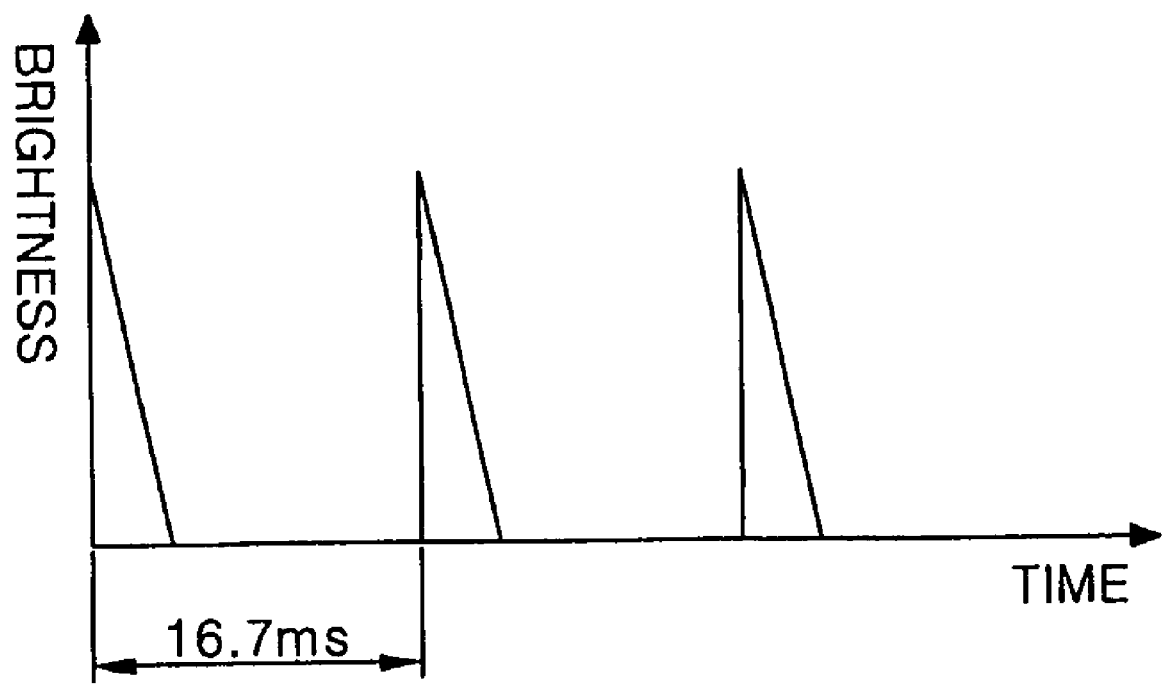
FIG. 1 illustrates impulse characteristics of related art cathode ray tubes.
Figure 2:
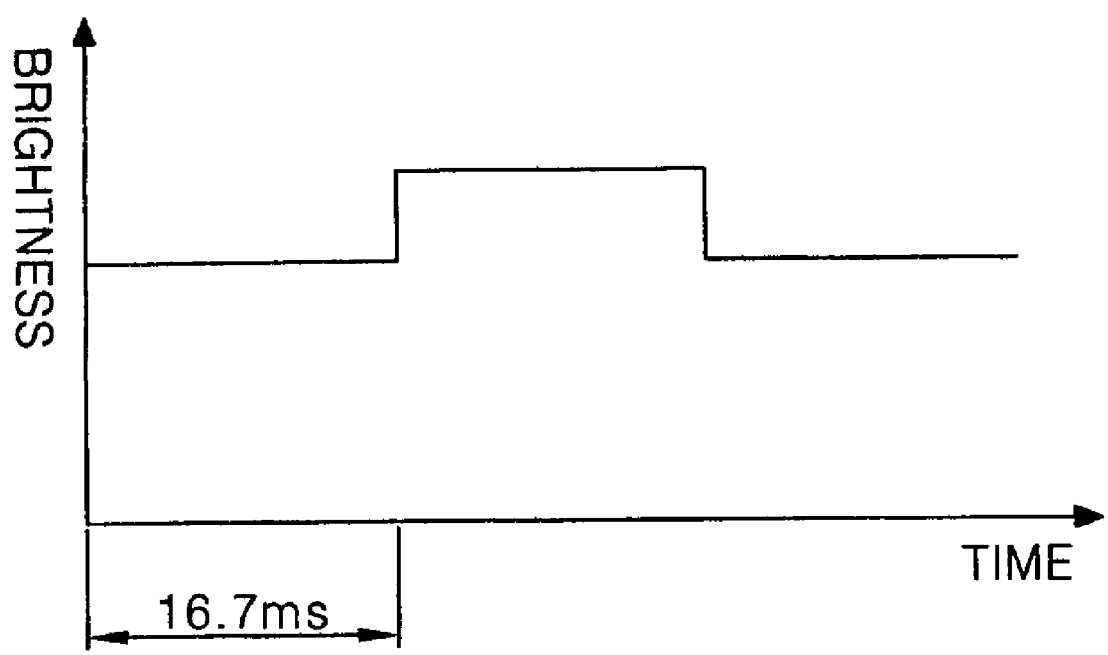
FIG. 2 illustrates data voltage maintaining characteristics of related art liquid crystal display devices.
Figure 3:
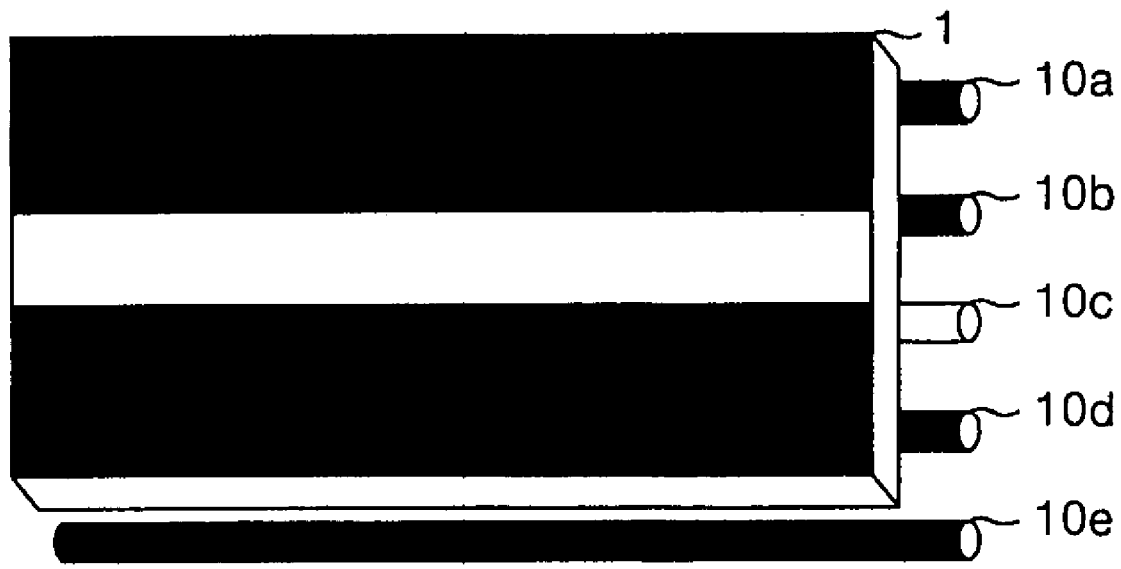
FIG. 3 illustrates a perspective view of a related art scanning backlight blinking system.
Figure 4:
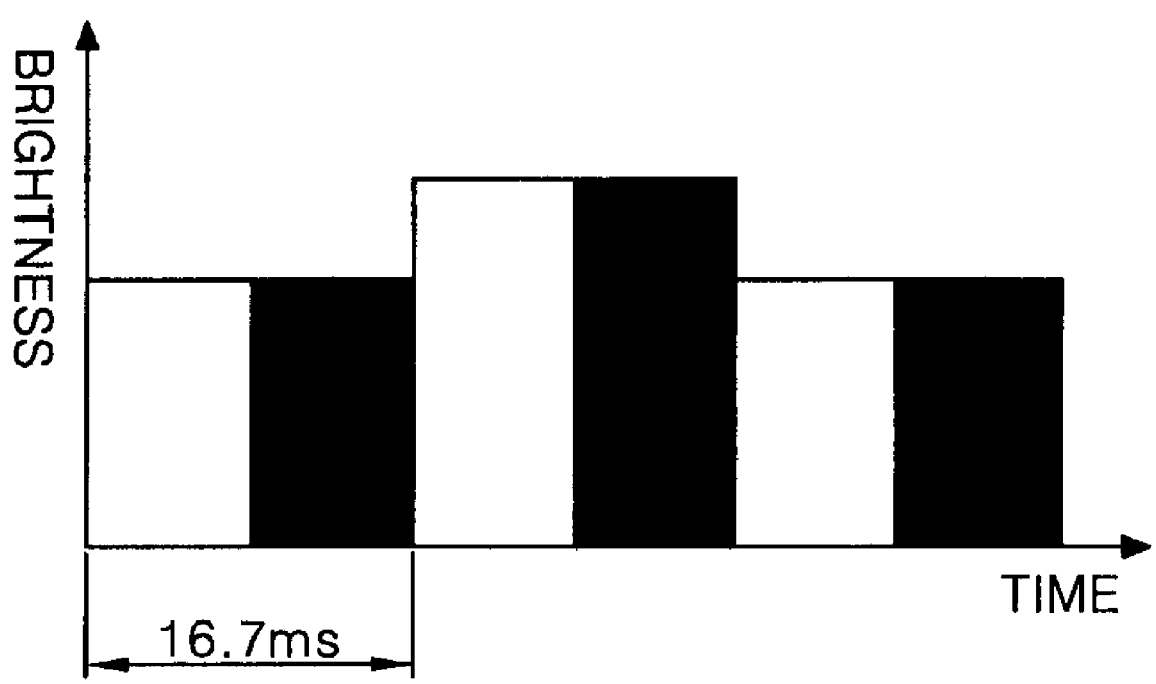
FIG. 4 illustrates impulse characteristics of a related art liquid crystal display device driven by a related art scanning backlight blinking system.
Figure 5:
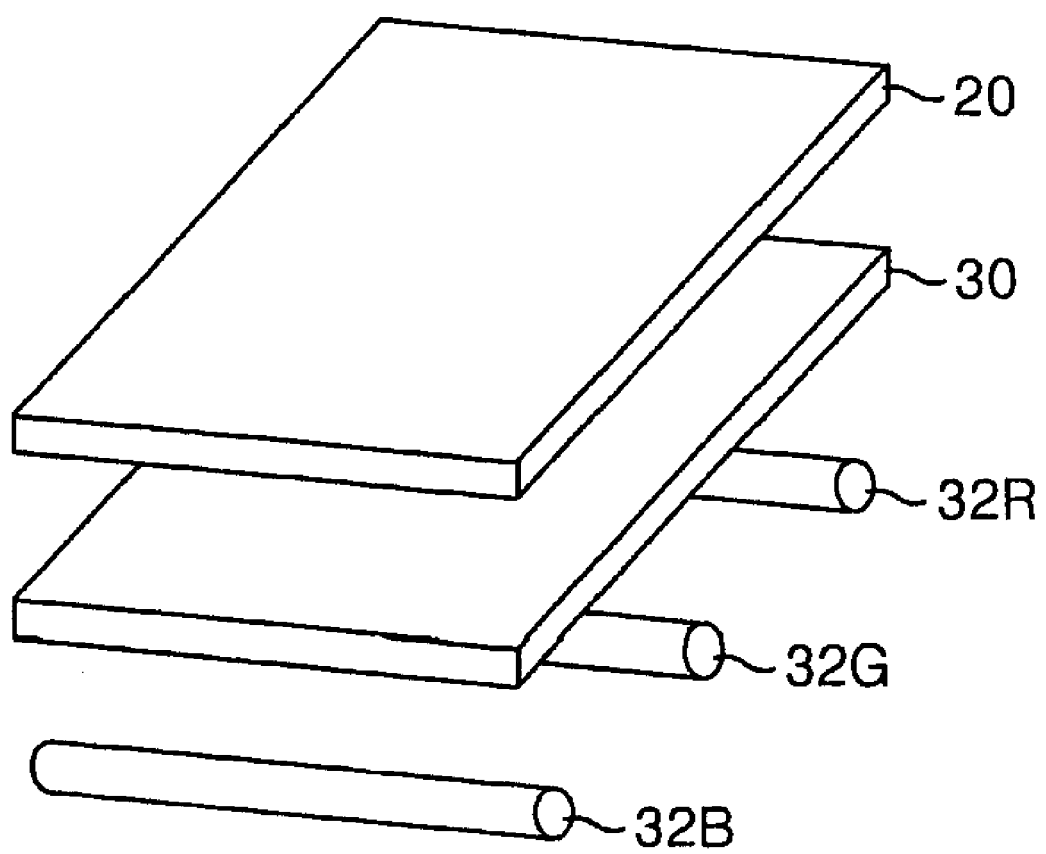
FIG. 5 illustrates a liquid crystal display panel driven according to a related art field sequence driving system.

Because each pixel within the LCD panel includes only first and second sub-pixels, the LCD panel 80 of the present invention transmits a greater amount of light emitted by the light source array 70 compared to related art LCD panels such as those illustrated in FIG. 5.

Moreover, since each frame period of the LCD panel 80 is divided into first and second sub-frames, the liquid crystal cells of the present invention can be driven at a reduced frequency of about 120 Hz compared to the frequency of about 180 Hz, required to drive liquid crystal cells of related art LCD panels such as those illustrated in FIG. 5.

Figure 6:
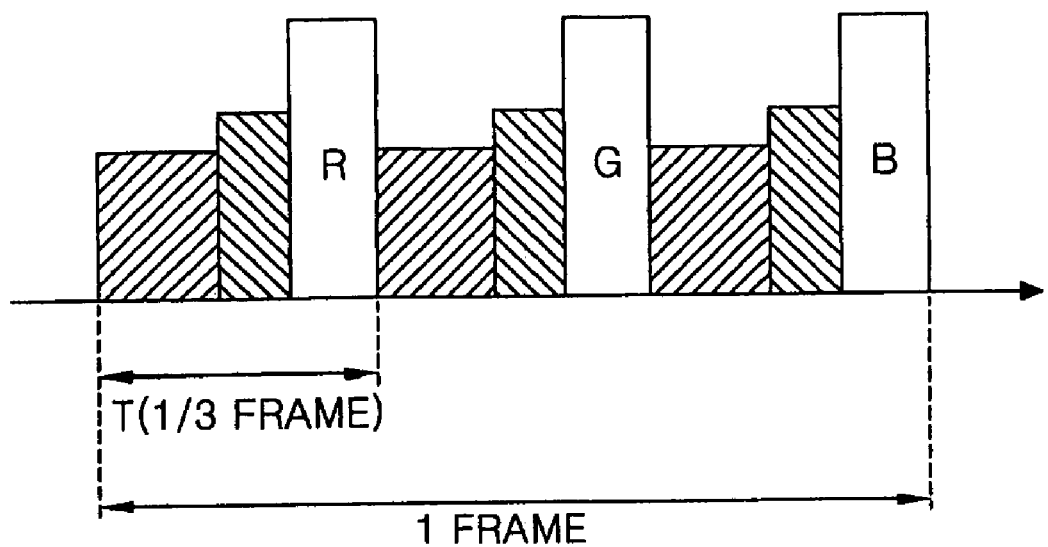
FIG. 6 illustrates an operation of the related art FS driving system shown in FIG. 5 applied to a liquid crystal display panel.

Further, the periods of each of the first and second sub-frames of the present invention are longer than the aforementioned related art sub-frames discussed above with respect to FIG. 6. Accordingly, the principles of the present invention may be effectively applied to TN, IPS, and VA mode LCD panels in addition to OCB and FLC mode LCD panels.

Lastly, since the liquid crystal cells of the present invention are driven at a relatively lower frequency of about 120 Hz, the principles of the present invention may be extended to driving LCD panels having vertical resolutions of about 768, equivalent to HDTV and XGA resolution. Further, since the liquid crystal cells of the present invention are driven at a relatively lower frequency of about 120 Hz, TFTs provided within the liquid crystal cell may be provided as amorphous silicon-type TFTs.

As described above, the LCD panel according to principles of the present invention comprise a plurality of pixels arranged in a matrix pattern and a light source array, wherein each pixel includes first and second sub-pixels capable of transmitting complementary colors and wherein the light source array includes red, green, and blue light sources. By providing only two sub-pixels within each pixel, the LCD panel of the present invention may display images brighter than related art LCD panels such as those illustrated in FIG. 5. Moreover, light sources within the light source array 70 remain activated for a greater amount of time within each sub-frame compared to light sources within related art LCD panels such as those illustrated in FIG. 5 because the driving frequency of liquid crystal cells within the LCD panel 80 is reduced compared to the driving frequency of liquid crystal cells within related art LCD panels such as those illustrated in FIG. 5. Accordingly, moving pictures may be effectively displayed at a increased brightness while reducing the driving frequency of the LCD panel 80.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel, comprising:
   a plurality of first and second sub-pixel pairs arranged in a matrix pattern, wherein a color of light transmittable by a color filter of the first sub-pixel is complementary to a color of light transmittable by a color filter of the second sub-pixel; and
   a light source array having first, second, and third light sources emitting first, second, and third colors of light, respectively;
   wherein the light source array emits light from just two of the light sources at the same time corresponding to the color of the light transmittable by the first and second sub-pixels.

2. The liquid crystal display panel according to claim 1, wherein
   the first sub-pixel is a blue sub-pixel; and
   the second sub-pixel is a yellow sub-pixel.

3. The liquid crystal display panel according to claim 2, wherein
   the first sub-pixel includes a blue sub-color filter transmitting blue light and absorbing red and green light; and
   the second sub-pixel includes a second sub-color filter transmitting red and green light and absorbing blue light.

4. The liquid crystal display panel according to claim 1, wherein
   the first sub-pixel is a green sub-pixel; and
   the second sub-pixel is a magenta sub-pixel.

5. The liquid crystal display panel according to claim 4, wherein
   the first sub-pixel includes a green sub-color filter transmitting green light and absorbing red and blue light; and
   the second sub-pixel includes a second sub-color filter transmitting red and blue light and absorbing green light.

6. The liquid crystal display panel according to claim 1, wherein
   the first sub-pixel is a red sub-pixel; and
   the second sub-pixel is a cyan sub-pixel.

7. The liquid crystal display panel according to claim 6, wherein
   the first sub-pixel includes a red sub-color filter transmitting red light and absorbing green and blue; and
   the second sub-pixel includes a second sub-color filter transmitting green and blue light and absorbing red light.

8. The liquid crystal display panel according to claim 1, wherein the area of the first sub-pixel is less than the area of the second sub-pixel.

9. An apparatus for driving a liquid crystal display panel having a plurality of pixels arranged in a matrix pattern, wherein each pixel includes a first sub-pixel and a second sub-pixel, and wherein a color of light transmittable by a color filter of the first sub-pixel is complementary to a color of light transmittable by a color filter of the second sub-pixel, the apparatus comprising:
   a light source array having first, second, and third light sources emitting first, second, and third colors of light, respectively; and
   a light source driver driving the light source array during a first sub-frame and a second sub-frame of the LCD panel, wherein the first and second sub-frames constitute a single frame of the LCD panel, and wherein the light source driver drives at least two light sources during each sub-frame.

10. The apparatus according to claim 9, wherein:
    the first sub-pixel is a blue sub-pixel transmitting blue light and absorbing red and green light; and
    the second sub-pixel is a yellow sub-pixel transmitting red and green light and absorbing blue light.

11. The apparatus according to claim 9, wherein:
    the first sub-pixel is a green sub-pixel transmitting green light and absorbing red and blue light; and
    the second sub-pixel is a magenta sub-pixel transmitting red and blue light and absorbing green light.

12. The apparatus according to claim 9, wherein:
    the first sub-pixel is a red sub-pixel transmitting red light and absorbing green and blue light; and
    the second sub-pixel is a cyan sub-pixel transmitting green and blue light and absorbing red light.

13. The apparatus according to claim 9, wherein
    the first light source emits red light;
    the second light source emits green light; and
    the third light source emits blue light.

14. The apparatus according to claim 9, wherein the light source driver activates
    the first and third light sources during the first sub-frame; and
    the second and third light sources during the second sub-frame.

15. The apparatus according to claim 9, wherein the light source driver divides gate lines on the liquid crystal display panel into at least one gate line group, and drives predetermined ones of the first to third light sources in accordance with an activation state of gate lines within each gate line group.

16. The apparatus according to claim 9, further comprising:
- a data driver that applies red, green, and blue data signals to the liquid crystal display panel within a single frame period;
- a gate driver that scans the liquid crystal display panel at least twice during one frame period; and
- a timing controller that controls the data driver, the gate driver, and the light source driver.

17. The apparatus according to claim 9, wherein the area of the first sub-pixel is less than the area of the second sub-pixel.

18. The apparatus according to claim 13, wherein the third light source is smaller than the first and second light sources.

19. A method for driving a liquid crystal display panel, having a plurality of pixels arranged in a matrix pattern, wherein each pixel includes a first sub-pixel and a second sub-pixel, and wherein a color of light transmittable by a color filter of the first sub-pixel is complementary to a color of light transmittable by a color filter of the second sub-pixel, the method comprising:
- dividing a single frame period of the liquid crystal display panel into a first sub-frame and a second sub-frame; and
- activating at least two of red, green, and blue light sources during the first and second sub-frames.

20. The method according to claim 19, wherein:
- the first sub-pixel is a blue sub-pixel transmitting blue light and absorbing red and green light; and
- the second sub-pixel is a yellow sub-pixel transmitting red and green light and absorbing blue light.

21. The method according to claim 19, wherein:
- the first sub-pixel is a green sub-pixel transmitting green light and absorbing red and blue light; and
- the second sub-pixel is a magenta sub-pixel transmitting red and blue light and absorbing green light.

22. The method according to claim 19, wherein:
- the first sub-pixel is a red sub-pixel transmitting red light and absorbing green and blue light; and
- the second sub-pixel is a cyan sub-pixel transmitting green and blue light and absorbing red light.

23. The method according to claim 19, wherein the activating at least two of the red, green, and blue light sources during the first and second sub-frames includes:
- activating the red and blue light sources during the first sub-frame; and
- activating the green and blue light sources during the second sub-frame.

24. The method according to claim 19, wherein step of emitting the light to the liquid crystal display panel includes driving predetermined ones of the first to third light sources in accordance with an activation state of gate lines within each gate line group.

* * * * *